(12) United States Patent
Bikumala et al.

(10) Patent No.: US 11,550,888 B2
(45) Date of Patent: Jan. 10, 2023

(54) UNLOCKING A DEVICE USING MULTIPLE PRINTS

(71) Applicant: EMC IP Holding Company LLC, Hopkinton, MA (US)

(72) Inventors: Sathish Kumar Bikumala, Round Rock, TX (US); Lakshmi Saroja Nalam, Bangalore (IN); Apoorva Sharma, Hyderabad (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 492 days.

(21) Appl. No.: 16/681,879

(22) Filed: Nov. 13, 2019

(65) Prior Publication Data

US 2021/0141881 A1 May 13, 2021

(51) Int. Cl.
*G06F 21/32* (2013.01)
*G06V 40/60* (2022.01)
*G06V 40/12* (2022.01)
*G06V 40/10* (2022.01)

(52) U.S. Cl.
CPC ............ *G06F 21/32* (2013.01); *G06V 40/117* (2022.01); *G06V 40/1365* (2022.01); *G06V 40/67* (2022.01)

(58) Field of Classification Search
CPC .. G06F 21/32; G06V 40/117; G06V 40/1365; G06V 40/67
See application file for complete search history.

(56) References Cited

U.S. PATENT DOCUMENTS

| | | | |
|---|---|---|---|
| 2018/0039817 A1* | 2/2018 | Romera Jolliff | G06F 21/32 |
| 2018/0253176 A1* | 9/2018 | Hajimusa | G06F 21/31 |
| 2018/0336530 A1* | 11/2018 | Johnson | G06Q 10/1093 |
| 2019/0347395 A1* | 11/2019 | Chao | H04M 1/026 |
| 2020/0092411 A1* | 3/2020 | Xu | G06V 40/1365 |
| 2021/0144008 A1* | 5/2021 | Prager | G08B 21/18 |

* cited by examiner

*Primary Examiner* — Premal R Patel
(74) *Attorney, Agent, or Firm* — Krishnendu Gupta; Nikhil Patel (57) ABSTRACT

In some examples, a computing device may display a user interface (UI) to configure a multiple print unlock. The UI may determine a first plurality of prints placed on a touchscreen. Individual prints of the first plurality of prints may include a thumb print or a fingerprint. After the computing device has been inactive for a predetermined amount of time, the UI may lock the computing device. The UI may determine a second plurality of prints placed on a touchscreen and perform a comparison of the second plurality of prints to the first plurality of prints. If the UI determines that the second plurality of prints matches the first plurality of prints, then the UI may unlock the computing device. If the UI determines that the second plurality of prints does not match the first plurality of prints, then the computing device may remain locked.

20 Claims, 5 Drawing Sheets

UNLOCKING A DEVICE USING MULTIPLE PRINTS

BACKGROUND OF THE INVENTION

Field of the Invention

This invention relates generally to unlocking a device and more particularly to using more than one print to unlock the device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable computing devices, such as smartphones, tablets, and 2-in-1 devices (e.g., a tablet that can be mated with a base that includes a keyboard to create a laptop), may lock the device when the computing device is not used for more than a predetermined amount of time. In the past, to unlock a computing device, the user may input a password (e.g., personal identification number or other sequence of numbers and/or letters). Newer computing devices enable a user to provide a print (e.g., fingerprint or thumbprint) to unlock the computing device. This may be accomplished using a dedicated scanner or using a touchscreen display device of the computing device to scan a print of one of the user's thumb or finger. However, this can result in the user inadvertently unlocking the computing device when handling the computing device.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may display a user interface (UI) to configure a multiple print unlock. The UI may determine a first plurality of prints placed on a touchscreen. Individual prints of the first plurality of prints may include a thumb print or a fingerprint. After the computing device has been inactive for a predetermined amount of time, the UI may lock the computing device. The UI may determine a second plurality of prints placed on a touchscreen and perform a comparison of the second plurality of prints to the first plurality of prints. If the UI determines that the second plurality of prints matches the first plurality of prints, then the UI may unlock the computing device. If the UI determines that the second plurality of prints does not match the first plurality of prints, then the computing device may remain locked.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a user to create a multiple print (e.g., two or more prints) unlock and use the multiple prints to unlock a computing device after the computing device is locked due to inactivity for more than a predetermined amount of time. Each print of the multiple prints is either a thumb print or a fingerprint. The user may select a predefined template or a custom template. The user may select a sequence option that determines whether an order in which the prints are provided is taken into consideration as part of the unlock process. After selecting the options, a user interface (UI) may prompt the user to enter two or more prints. If the sequence option is enabled, the UI may determine an order in which the two or more prints were initially entered. The UI may prompt the user to re-enter the prints to verify the prints being used to unlock. After the user subsequently enters the two or more prints, the UI may compare the subsequently provided prints with the initially provided prints. If the sequence option is enabled, the UI may compare the order in which the subsequently provided prints were entered and compare the order with the initially provided prints. If the subsequently provided prints match the initially provided prints and the order in which the subsequently provided prints were entered matches the order in which the initially provided prints were provided, then the UI may save the prints, the order, and the option selections. If the sequence option is disabled, the UI may prompt the user to re-enter the prints to verify the prints being used to unlock. After the user subsequently enters the two or more prints, the UI may compare the subsequently provided prints with the initially provided prints. If the subsequently provided prints match the initially provided prints, then the UI may save the prints and the option selections.

After a predetermined period of inactivity, a computing device may lock itself. A user may be prompted to provide two or more prints to unlock the computing device. The user may provide two or more prints in a particular order. A user interface (UI) may compare the received prints with previously saved prints. If the user has not selected a sequence option and the prints match, then the UI may unlock the computing device. If the prints do not match, the UI may prompt the user to retry providing the prints. If the user has selected a sequence option and the prints match, then the UI may determine if the sequence in which the prints were provided matches an order associated with the previously saved prints. If the sequence in which the prints were provided does not match the order in which the previously saved prints were provided, then the UI may prompt the user to retry providing the prints. If the user fails to provide prints that match the saved prints and, if the sequence option is enabled, fails to provide the prints in the order in which the saved prints were provided, then the UI may provide the user with a predetermined number of retries, after which the UI may lockout the user and ask the user to contact a service representative or the like.

In some examples, a computing device (e.g., a smartwatch, a smartphone, a tablet, a laptop, or a 2-in-1) may include one or more processors and one or more non-transitory computer readable media storing instructions executable by the one or more processors to perform various operations. For example, the operations may include displaying a UI to configure a multiple print unlock for the computing device. The operations may include determining a first plurality of prints placed on a touchscreen display device connected to the computing device. The first plurality of prints may include one of: (i) a first thumb print and a second thumb print, (ii) the first thumb print, the second thumb print, and one or more fingerprints, or (iii) two or more of the fingerprints. The operations may include determining that the computing device has been inactive for at least a predetermined amount of time (e.g., 10, 20, 30, 40, 50, 60 seconds or the like) and automatically (without human interaction) locking the computing device to prevent the computing device from being used. The operations may include determining a second plurality of prints placed on the touchscreen display device. The operations may include performing a comparison between the second plurality of prints and the first plurality of prints. The operations may include determining, based on the comparison, that the second plurality of prints matches the first plurality of prints, and unlocking the computing device.

The operations may include locking the computing device based on determining that the computing device has been inactive for at least the predetermined amount of time. The operations may include determining that a sequence option is plurality. The operations may include determining a third plurality of prints placed on the touchscreen display device. The operations may include performing a first comparison of the first plurality of prints to the third plurality of prints. The operations may include determining a received order in which the third plurality of prints are placed on the touchscreen display device. The operations may include performing a second comparison of an order associated with the first plurality of prints to the received order. The operations may include determining, based on the first comparison and the second comparison, that: (i) the third plurality of prints matches the first plurality of prints, and (ii) the received order matches the order associated with the first plurality of prints and unlocking the computing device.

The operations may include determining that a hint option is selected and displaying, on the touchscreen display device, an outline associated with each print in the first plurality of prints. The operations may include determining that an order hint option is selected and displaying, on the touchscreen display device, a number within the outline associated with each print indicating a numerical order in which to provide the second plurality of prints.

The operations may include determining that the computing device has been inactive for at least the predetermined amount of time and locking the computing device. The operations may include determining a fourth plurality of prints placed on the touchscreen display device. The operations may include determining that the fourth plurality of prints do not match the first plurality of prints and prompting a user to retry. The operations may include determining that the user has performed a maximum number of retries (e.g., 2, 3, 4, 5, or 6) and performing a lockout process that includes ignoring additional retries until a predetermined amount of time has elapsed.

When a sequence option is selected, a time difference between a particular print of the plurality of prints being placed on the touchscreen display device and a subsequent print of the plurality of prints being placed on the touchscreen display device may be within a predetermined time interval (e.g., between about 300 milliseconds (ms) to about 800 ms). When the sequence option is deselected, the time difference between when a particular print is placed on the touchscreen display device and a subsequent print is placed on the touchscreen display device may be below the predetermined time interval (e.g., less than about 300 ms).

Figure 1:
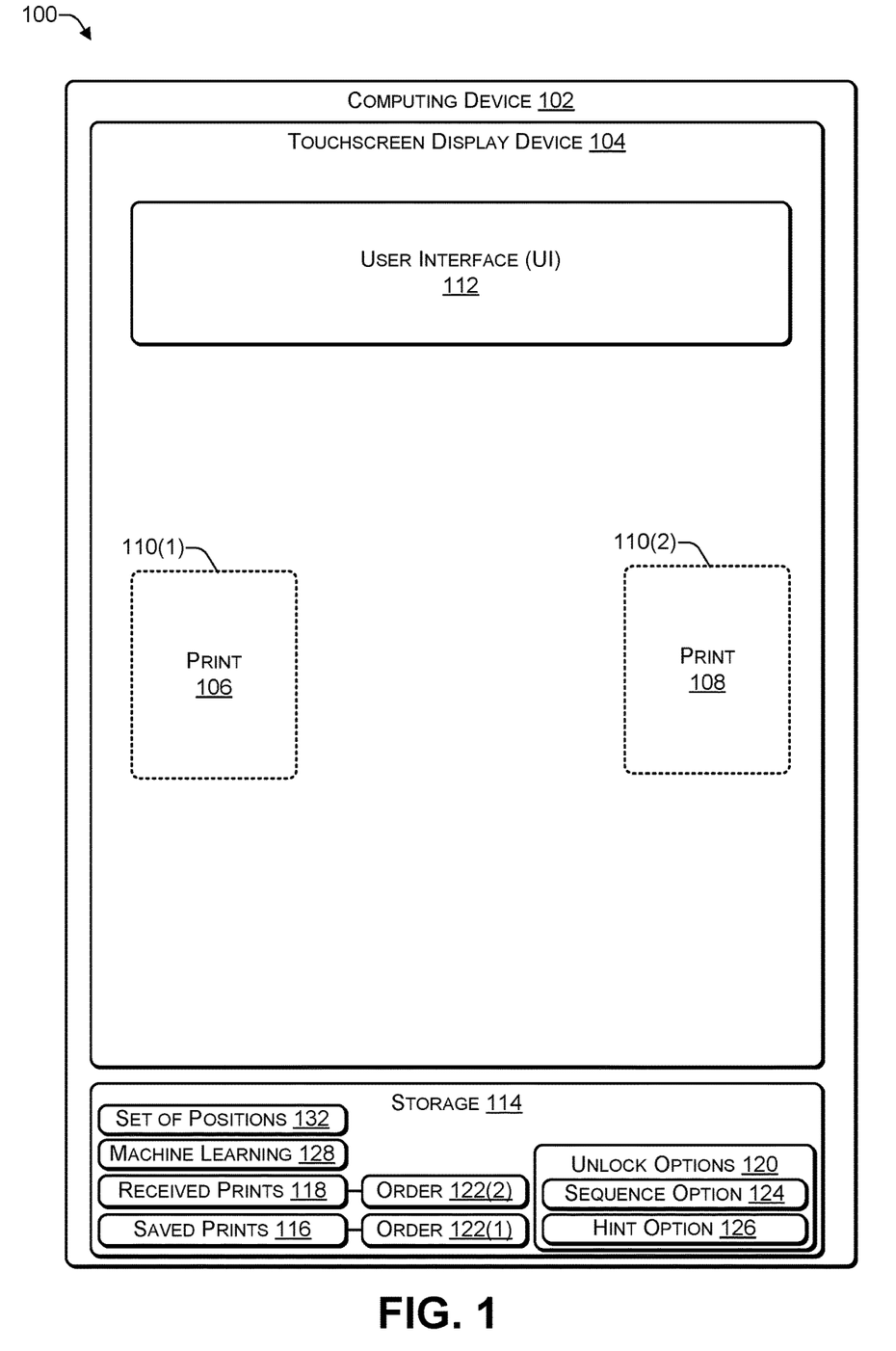
FIG. 1 is a block diagram of a system illustrating defining or entering a two print unlock for a computing device, according to some embodiments.

FIG. 1 is a block diagram of a system 100 illustrating defining or entering a two print unlock for a computing device, according to some embodiments. The system 100 illustrates how a user of a computing device 102 may define a two print unlock to use with the computing device 102 and later, when the computing device 102 is locked, enter two prints to unlock the computing device 102. The term print, as used herein, refers to a thumb print or a fingerprint of either hand. The term prints refers to two or more prints (e.g., from either or both of the right hand and the left hand).

The computing device 102 may be connected to a touchscreen display device 104. While FIG. 1 illustrates the computing device 102 in the form of a tablet, depending on the implementation, the touchscreen display device 104 may be separate (but connected to) the computing device 102, such as a in the form of a laptop.

Defining an Unlock

To define a two print unlock, the user of the computing device 102 may use a user interface (UI) 112 and enter into one or more levels of a system menu, e.g., "settings" and "set unlock password", to define unlock prints. The UI 112 may display a message 104 requesting that the user enter a print 106 and a print 108. For example, the print 106 may be of a left thumb and the print 108 may be a print of a right thumb. As another example, the print 106 may be of a left thumb and the print 108 may be a print of a finger (e.g., fore finger, middle finger, ring finger, or pinky) of the right hand. As yet another example, the print 108 may be of a right thumb and the print 106 may be a print of a finger of the left hand.

The user may use the UI 112 to select a sequence option 124 of unlock options 120 to instruct the UI that a sequence (e.g., order) in which the prints 106, 108 are entered is to be used to unlock the computing device 102. If the user selects the sequence option 124, then the UI 112 may determine an order in which the user enters the prints 106, 108. For example, the user may enter the print 106 followed (e.g., after at least a predetermined time interval, such as 300 milliseconds (ms) or more) by the print 108, the user may enter the print 108 followed (e.g., after the predetermined time interval) by the print 106, or the user may enter the print 106 simultaneously (e.g., within the predetermined time interval) with the print 108.

In some cases, the UI 112 may use a machine learning algorithm 128 to suggest at least two patterns for entering the prints 106, 108 when performing an unlock. For example, when the user is using the computing device 102, the machine learning algorithm 128 may monitor the user's hand position (e.g., position means a location on the touchscreen display device 104), finger positions, and fingertip positions on the touchscreen display device 104. The machine learning algorithm 128 may use the data gathered by monitoring the user's hand, finger, and fingertip positions as training data to identify and suggest a set of (print) positions 132 (for the prints 106, 108). The set of positions 132 may include a pattern of the prints 106, 108 on the touchscreen display device 104 that the user most frequently performs. An advantage of using a print positions that the machine learning 128 has determined (based on historical data) is frequently performed is that the user is more likely to remember the print positions and can quickly place the user's prints in the positions 132(1) to perform an unlock. The set of positions 132 may include a pattern of the prints 106, 108 on the touchscreen display device 104 that the user least frequently performs or has not performed. The advantage of using print positions that the machine learning 128 has determined that the user infrequently performs is that the user is unlikely to accidentally unlock the computing device 102. The user can of course use the suggested set of positions 132 or input the prints 106, 108 in a particular pattern and have the UI 112 save the positions as part of the saved prints 116.

The computing device 102 may include storage 114 to store data and software applications. The storage 114 may be non-volatile storage such that data stored in the storage 114 is accessible after the computing device 102 performs reboot or restart. For example, the storage 114 may be used to store the unlock options 120.

The user may use the UI 112 to select a hint option 126 (of the unlock options 120) in which the unlock screen displays an outline 110(1) indicating where the user is to provide the print 106 and an outline 110(2) indicating where the user is to provide the print 108. If the user selects the hint option 126 and the sequence option 124, then the outlines 110 may indicate an order in which the prints 106, 108 are to be provided by the user to unlock the computing device 102. For example, if the hint option 126 is enabled, then a "1" may be displayed inside the outline 110(1) and a "2" displayed inside the outline 110(2) to hint at the order in which the prints 106, 108 are to be provided.

After the user has provided the prints 106, 108, the UI 112 may save the prints 106, 108 as saved prints 116. The UI 112 may ask the user to re-enter the prints 106, 108 to confirm the prints (and, if applicable, the order in which the prints are provided). If subsequently provided prints 106, 108 do not match the saved prints 116, then the UI 112 may ask the user to repeatedly provide the prints 106, 108 until the subsequently provided prints match (e.g., 90%, 95%, or 98% match after a comparison) the saved prints 116 or until a predetermined number of retries has been performed. If the sequence option 124 is enabled, the UI 112 may determine whether the prints 106, 108 match the saved prints 116 and whether an order in which the user provides subsequent prints 106, 108 matches an order 122(1) in which the saved prints 116 were received (e.g., 106 followed by 108, 108 followed by 106, or 106 and 108 at about the same time). For example, if the UI 112 determines that the order in which the prints 106, 108 are provided does not match the order 122(1) of the saved prints 116, then the UI 112 may ask the user to repeatedly provide the prints 106, 108 until the subsequent order matches the order 122(1) in which the saved prints 116 were received.

After the UI 112 has confirmed the prints 106, 108 that the user is to provide to unlock the computing device 102, the UI 112 may save the prints 106, 108 as the saved prints 116. The UI 112 may save the unlock options 120, including the sequence option 124 (e.g., indicating whether an order in which the prints 106, 108 are received is to be considered) and hint option 126 (e.g., whether or not to provide a hint by displaying the outlines 110).

Providing Prints to Unlock the Device

The computing device 102 may lock itself under particular conditions, such as if the computing device 102 is unused for more than a predetermined amount of time (e.g., X minutes, where X=1, 2, 5, 10 or the like). After the computing device 102 is locked, if the UI 112 detects that the user is attempting to use the computing device 102, then the UI 112 may display a message indicating that the computing device 102 is currently locked and that to unlock the computing device 102 (e.g., to use the computing device 102), the user is to provide unlock prints. The user may provide the prints 106, 108 in a particular order. The UI 112 may receive the prints 106, 108, using the touchscreen display device 104, as received prints 118.

If the sequence option 124 of the unlock options 120 is enabled, the UI 112 may determine an order 122(2) associated with the received prints 118. For example, the UI 112 may determine, based on the received prints 118, that print 106 is provided at time T1, print 108 is provided at time T2, and determine a difference delta=T2−T1 (e.g., subtract T1 from T2). If delta satisfies a predetermined threshold (e.g., Y milliseconds, Y=600, 500, 300 or the like) and the received prints 118 match the saved prints 116, then the UI 112 may unlock the computing device 102.

If the sequence option 124 of the unlock options 120 is not enabled, then the UI 112 may determine whether the received prints 118 match the saved prints 116 (e.g., ignoring the order in which the received prints 118 were provided). The UI 112 may unlock the computing device 102 after determining that the received prints 118 match the saved prints 116.

Thus, if either (i) the received prints 118 do not match the saved prints 116 or (ii) the order 122(2) of the received prints 118 does not match the order 122(1) of the saved prints 116), then the computing device 102 may remain locked. The UI 112 may provide the user with a predetermined number of retries (e.g., 2, 3, 4, or the like) to unlock the computing device 102. In some cases, if the user requests a hint using the hint option 126, then the UI 112 may display the outlines 110 and, based on the sequence option 124, an order to provide the prints 106, 108. If the user exceeds the predetermined number of retries, then the UI 112 may not accept further unlock attempts and may display a message asking the user to contact a representative of a manufacturer of the computing device 102.

Figure 2:
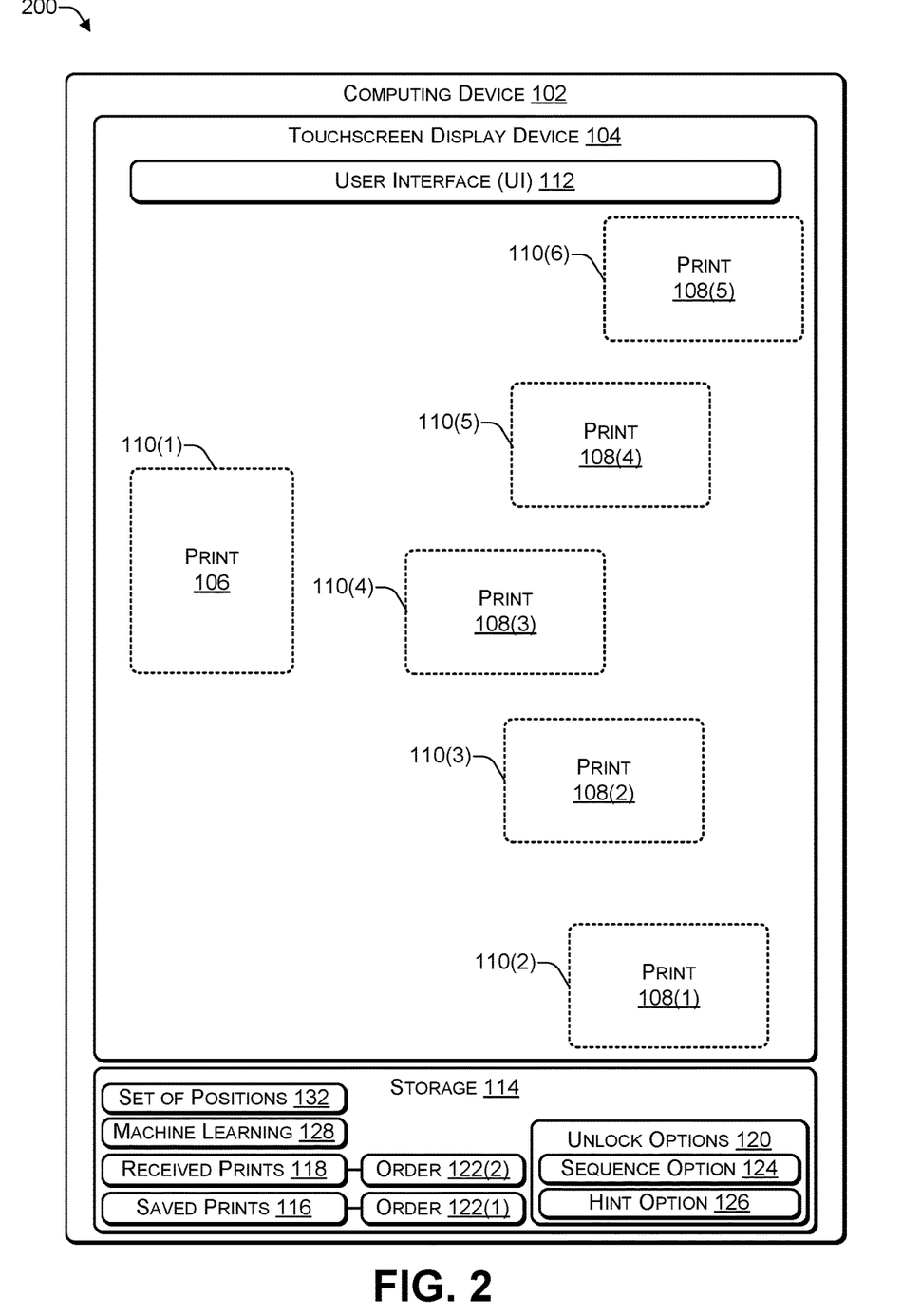
FIG. 2 is a block diagram of a system illustrating defining or entering a multiple print unlock for a computing device, according to some embodiments.

FIG. 2 is a block diagram of a system illustrating defining or entering a multiple print unlock for a computing device, according to some embodiments. While FIG. 2 illustrates a right-handed user defining and providing an unlock using two or more prints, e.g., zero or one print from a left hand and one or more prints from a right hand, the same techniques may be applied by a left-handed user by switching left and right. While FIG. 2 illustrates the computing device 102 in the form of a tablet, in other implementations, the touchscreen display device 104 may be separate (but connected to) the computing device 102, such as a in the form of a laptop.

Defining a Multiple Print Unlock

To define a multiple print unlock, the user of the computing device 102 may use the user interface (UI) 112 and enter into one or more levels of a system menu, e.g., "settings" and "set unlock password", to define unlock prints. The UI 112 may provide an option to select from one or more predefined templates or an option to create a custom template. After the user selects either a custom template or a predefined template, the UI 112 may display a message requesting that the user enter two or more prints 106, 108. For example, the user may provide the print 106 (e.g., left thumb), and provide one or more of prints 108(1) (e.g., right thumb), 108(2) (e.g., right forefinger), 108(3) (e.g., right middle finger), 108(4) (e.g., right ring finger), and 108(5) (e.g., right little finger). As another example, the user may not provide the print 106, and provide two or more of the prints 108(1) (e.g., right thumb), 108(2) (e.g., right forefinger), 108(3) (e.g., right middle finger), 108(4) (e.g., right ring finger), and 108(5) (e.g., right little finger).

The user may use the UI 112 to select the sequence option 124 (e.g., of the unlock options 120) to indicate that the unlock process uses an order in which two or more of the prints 106, 108 are provided to unlock the computing device 102. The UI 112 may ask the user to provide two or more of the prints 106, 108. If the user selects the sequence option 124, then the UI 112 may determine an order in which the user enters two or more of the prints 106, 108. For example, the user may enter the print 106 and one or more of the prints 108, with a pause (e.g., between a first predetermined time interval and second predetermined time interval, such as between about 300 ms to about 800 ms) between when each print is provided. To illustrate, the entry may be: (i) print 106, pause, and (ii) one or more of print 108(1), pause, print 108(2), pause, print 108(3), pause, print 108(4), pause, and print 108(5). As another example, the user may enter one or more of the prints 108 and the print 106, with the pause between when each print is provided. To illustrate, the entry may be: (i) one or more of print 108(1), pause, print 108(2), pause, print 108(3), pause, print 108(4), pause, print 108(5), pause, along with (ii) print 106. As a further example, the user may enter the print 106 simultaneously (e.g., less than a predetermined time period, such as 300 milliseconds (ms)) with the prints 108. To illustrate, the entry may be: substantially simultaneously (i) print 106 and (ii) one or more of print 108(1), print 108(2), print 108(3), print 108(4), and print 108(5). As yet another example, the user may enter not enter the print 106 and may enter two or more of the prints 108 in a particular sequence with a pause in-between each print. To illustrate, the entry may be two or more of: print 108(1), pause, print 108(2), pause, print 108(3), pause, print 108(4), pause, and print 108(5). As a further example, the user may enter not enter the print 106 and enter two or more of the prints 108 substantially at the same time (e.g., within 300 ms). To illustrate, the entry may be: substantially simultaneously two or more of print 108(1), print 108(2), print 108(3), print 108(4), and print 108(5). Of course, if the sequence option is not enabled, then the UI 112 ignores the order in which the prints 106, 108 are provided.

The user may use the UI 112 to select the hint option 126 (e.g., of the unlock options 120) in which the unlock screen displays outlines of two or more of 110(1), 110(2), 110(3), 110(4), 110(5), 110(6) indicating where the user is to provide the prints 106, 108. If the user selects the sequence hint option 126, then the outlines 110 may indicate an order in which the prints 106, 108 are to be provided. For example, if the sequence hint option 126 is enabled, and the user requests a sequence hint, then the outline 110(1) may display a "1" inside the outline 110(1) and the outline 110(2) may display a "2" inside the outline 110(2) and so on.

After the user has provided the prints 106, 108, the UI 112 may ask the user to re-enter the prints 106, 108 to confirm. If the subsequently provided prints 106, 108 do not match the previously provided prints 106, 108, then the UI 112 may repeatedly (for a predetermined number of retries, e.g., 2, 3, 4, 5, 6 or the like) ask the user to provide the prints 106, 108 until the prints 106, 108 provided a subsequent time match the prints 106, 108 that were previously provided. If the sequence option is enabled, the UI 112 may verify whether an order in which the subsequently provided prints 106, 108 were entered is the same order as the previously (or initially) provided prints 106, 108. If the UI 112 determines that the order in which the subsequently provided prints 106, 108 does not match the order of the previously (or initially) provided prints 106, 108, then the UI 112 may repeatedly ask the user (e.g., a predetermined number of retries) to provide the prints 106, 108 until the order of the subsequently provided prints 106, 108 matches the order of the previously (or initially) provided prints 106, 108 and the subsequently provided prints 106, 108 match the previously (or initially) provided prints 106, 108. After a predetermined number of retries, if the subsequently provided prints 106, 108 do not match the previously (or initially) provided prints 106, 108 or, when the sequence option 124 is enabled, if the order of the subsequently provided prints 106, 108 does not match the order of the previously (or initially) provided prints 106, 108, then the UI 112 may ask the user to restart the process of entering unlock prints.

After the UI 112 has verified the prints 106, 108 to be used to unlock the computing device 102, the UI 112 may save the prints 106, 108 as the saved prints 116. If the sequence options 124 is selected, the UI 112 may save the order 122(1) associated with the saved prints 118 that indicates the sequence in which the prints 106, 108 are to be provided to unlock the computing device 102. The UI 112 may save the hint option 126 that indicates whether a hint is to be provided if the user requests a hint.

The computing device 102 may transition from an unlocked state to a locked state under particular conditions, such as if the computing device 102 is unused for more than a predetermined amount of time (e.g., X minutes, where X=1, 2, 5, 10 or the like). In the unlocked state, all the functionality of the computing device 102 is available. In the locked state, the functionality of the computing device 102 is unavailable and becomes available after the user enters the prints 106, 108 that match the saved prints 118 and, if the sequence option 124 is selected, prints 106, 108 are provided in the order 122(1).

In some cases, the UI 112 may use a machine learning algorithm 128 to suggest at least two patterns for entering the prints 106, 108 when performing an unlock. For example, when the user is using the computing device 102, the machine learning algorithm 128 may monitor the user's hand position (e.g., position means a location on the touchscreen display device 104), finger positions, and fingertip positions on the touchscreen display device 104. The machine learning algorithm 128 may use the data gathered by monitoring the user's hand, finger, and fingertip positions as training data to identify and suggest a set of (print) positions 132 (for the prints 106, 108). The set of positions 132 may include a pattern of the prints 106, 108 on the touchscreen display device 104 that the user most frequently performs. An advantage of using a print positions that the machine learning 128 has determined (based on historical data) is frequently performed is that the user is more likely to remember the print positions and can quickly place the user's prints in the positions 132(1) to perform an unlock. The set of positions 132 may include a pattern of the prints 106, 108 on the touchscreen display device 104 that the user least frequently performs or has not performed. The advantage of using print positions that the machine learning 128 has determined that the user infrequently performs is that the user is unlikely to accidently unlock the computing device 102. The user can of course use the suggested set of positions 132 or input the prints 106, 108 in a particular pattern and have the UI 112 save the positions as part of the saved prints 116.

Entering Multiple Prints to Unlock a Device

After the computing device 102 is locked, if the UI 112 detects that the user is attempting to use the computing device 102, then the UI 112 may display a message indicating that the computing device 102 is currently locked and prompt the user to enter the prints 106, 108 to unlock the computing device 102. The user may provide the prints 106, 108 in a particular order. The UI 112 may receive, using the touchscreen display device 104, the prints 106, 108, to create the received prints 118. If the sequence option 124 (of the unlock options 120) is enabled, the UI 112 may determine the order 122(2) of the received prints 118. For example, the UI 112 may determine that the print 106 is provided at time T1, the print 108 is provided at time T2, and so on and determine a difference, e.g., delta=T2−T1 (e.g., subtract T1 from T2) between when each print of multiple prints is received. If the delta (time difference) between when each print is received satisfies a predetermined threshold (e.g., Y milliseconds, Y=600 ms, 500 ms, 300 ms or the like), the order 122(2) matches the order 122(1), and the received prints 118 match the saved prints 116, then the UI 112 may unlock the computing device 102. If the sequence option 124 is not enabled, then the UI 112 may determine whether the received prints 118 match the saved prints 116 (e.g., ignoring the order 122(2) in which the received prints 118 were provided). The UI 112 may unlock the computing device 102 if the UI 112 determines that the received prints 118 match the saved prints 116. If the received prints 118 do not match the saved prints 116 or the order 122(2) does not match the order 122(1), then, in some cases, the user may request a hint, and the UI 112 may display the outlines 110. The UI 112 may provide the user with a predetermined number of retries to unlock the computing device 102. If the received prints 118 do not match the saved prints 116 or the order 122(2) does not match the order 122(1), then the UI 112 may lock out the user.

Thus, if the sequence option 124 is disabled, then the computing device 102 may remain unlocked until the received prints 118 match the saved prints 116. If the sequence option 124 is enabled, the computing device 102 may remain unlocked until the received prints 118 match the saved prints 116 and the order 122(2) of the received prints 118 matches the order 122(1) of the saved prints 116. The UI 112 may enable the user to enter the prints 106, 108 a predetermined number of times (e.g., predetermined number of tries) before locking out the user permanently. If the user is permanently locked out, the user may contact a representative of the manufacturer of the computing device 102 to reset the unlock code. In some cases, if the user enabled the sequence option and the received prints 118 do not match the saved prints 116, then the computing device 102 may reset the unlock code by asking the user to enter two (or more) prints, such as both thumb prints or a thumb print and a finger print. Resetting the unlock code may result in the UI 112 asking the user to enter two or more prints, specify whether to use a sequence option and the like, as described herein.

Figure 3:
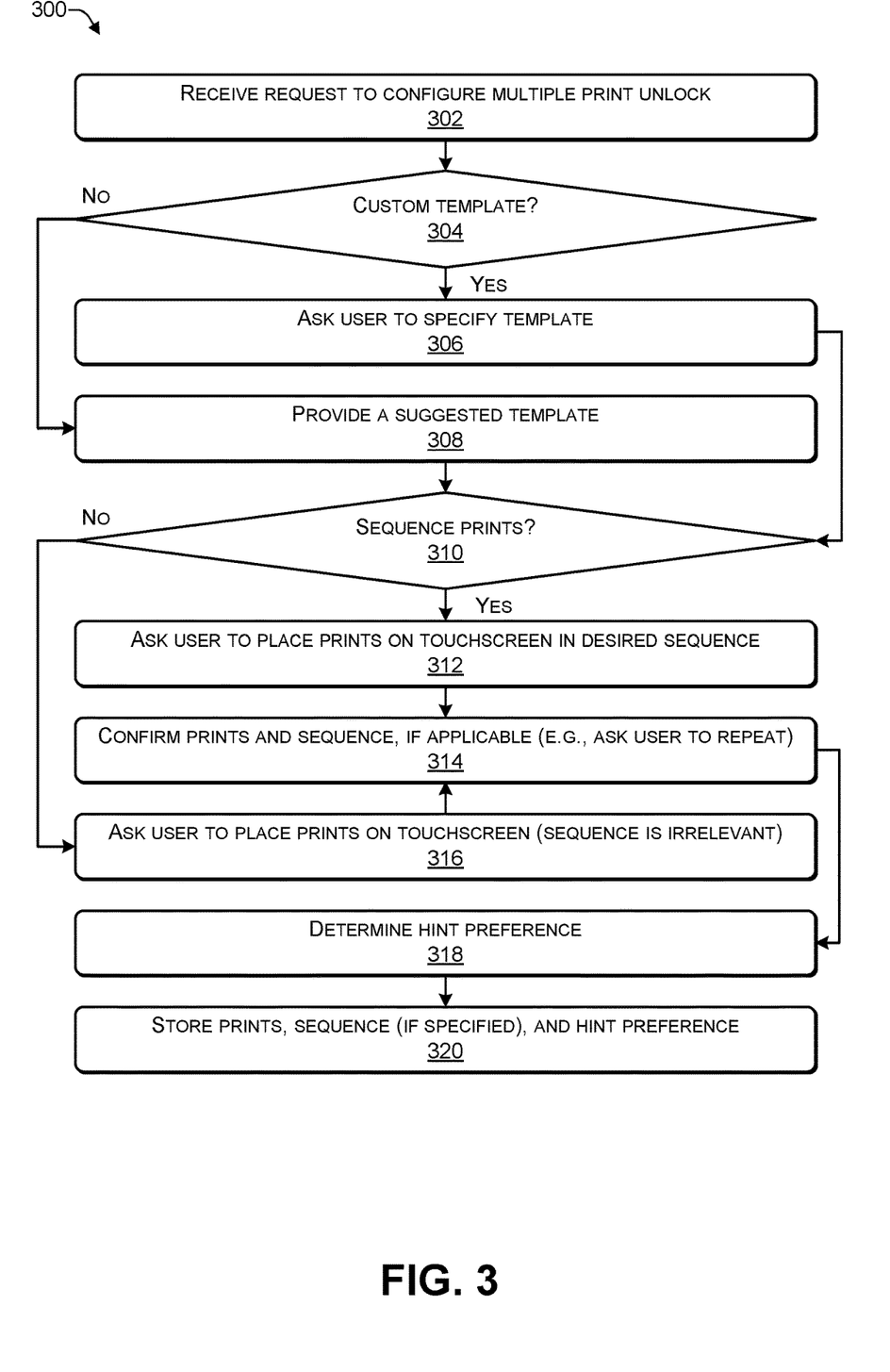
FIG. 3 is a flowchart of a process to define a multiple print unlock, according to some embodiments.
Figure 4:
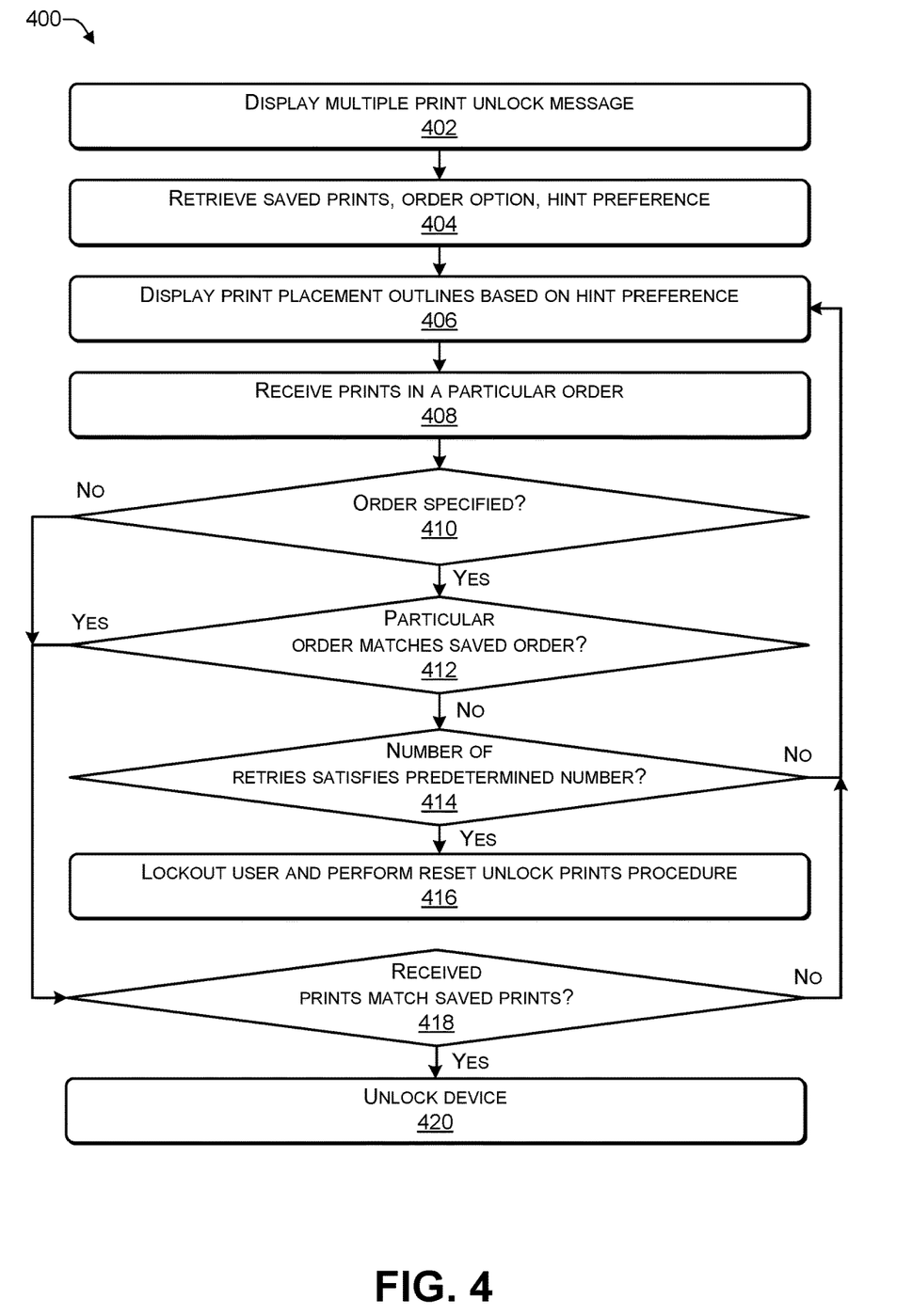
FIG. 4 is a flowchart of a process to receive a multiple print unlock, according to some embodiments, according to some embodiments.

In the flow diagrams of FIG. 3 and FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1 and 2 as described above, although other models, frameworks, systems and environments may be used to implement the processes.

FIG. 3 is a flowchart of a process 300 to define a multiple print unlock, according to some embodiments. For example, the process 300 may be performed by a software application executing on a computing device, such as the UI 112 of FIGS. 1 and 2.

At 302, the process may receive a request to configure a multiple print unlock. At 304, the process may determine whether the user desires to specify a custom template. If the process determines, at 304, that "yes" the user desires to specify a custom template, then the process may proceed to 306, where the user may be asked to specify a template (e.g., by placing two or more prints on the touchscreen display device), and the process may proceed to 310. If the process determines, at 304, that "no" the user does not desire to specify a custom template, then the process may proceed to 308, where a suggested template (e.g., suggested by machine learning based on observing the way the user uses the computing device) may be provided, and the process may proceed to 310. For example, in FIG. 2, the user of the computing device 102 may use the user interface (UI) 112 and enter into one or more levels of a system menu, e.g., "settings" and "set unlock password", to define unlock prints. The UI 112 may provide an option to select from one or more predefined templates (e.g., defined based on how the user places the user's prints on the touchscreen display device 104 when using the computing device 102 for normal operations, such as originating or receiving a phone call, accessing the internet, or the like) or an option to create a custom template. After the user selects either a custom template or a predefined template, the UI 112 may display a message requesting that the user enter two or more prints 106, 108.

At 310, the process may determine whether the user has selected a sequence option (e.g., indicating that the order in which prints are provided is taken into consideration during the unlock process). If the process determines, at 310, that "yes" the sequence option is selected, then the process may ask the user to place the user's prints on the touchscreen display device in a desired sequence, at 312, and ask the user to confirm the prints and the desired sequence by entering the user's prints in the desired sequence (e.g., until the subsequent sequence matches the previous sequence and the subsequently provided prints match the previously provided prints), at 314. If the process determines, at 310, that "no" the sequence option is unselected, then the process may ask the user to place the user's prints on the touchscreen display device, at 316, and ask the user to confirm the desired sequence by re-entering the user's prints (the process ignores the order in which the prints are provided), at 314. The process may then proceed to 318. For example, in FIG. 2, the user may use the UI 112 to select the sequence option 124 (e.g., of the unlock options 120) to indicate that the unlock process uses an order in which two or more of the prints 106, 108 are provided to unlock the computing device 102. If the user selects the sequence option 124, then the UI 112 may ask the user to provide two or more of the prints 106, 108 and determine an order in which the user enters two or more of the prints 106, 108. If the sequence option is not enabled, then the UI 112 ignores the order in which the prints 106, 108 are provided. After the user has provided the prints 106, 108, the UI 112 may ask the user to re-enter the prints 106, 108 to confirm. If the subsequently provided prints 106, 108 do not match the previously provided prints 106, 108, then the UI 112 may repeatedly (for a predetermined number of retries, e.g., 2, 3, 4, 5, 6 or the like) ask the user to provide the prints 106, 108 until the prints 106, 108 provided a subsequent time match the prints 106, 108 that were previously provided. If the sequence option is enabled, the UI 112 may verify whether an order in which the subsequently provided prints 106, 108 were entered is the same order as the previously (or initially) provided prints 106, 108. If the UI 112 determines that the order in which the subsequently provided prints 106, 108 does not match the order of the previously (or initially) provided prints 106, 108, then the UI 112 may repeatedly ask the user (e.g., a predetermined number of retries) to provide the prints 106, 108 until the order of the subsequently provided prints 106, 108 matches the order of the previously (or initially) provided prints 106, 108 and the subsequently provided prints 106, 108 match the previously (or initially) provided prints 106, 108.

At 318, the process may determine whether a hint preference is enabled (e.g., whether to provide a hint regarding where to place the prints and the sequence, if applicable, an order of the prints). For example, in FIG. 2, the user may use the UI 112 to select the hint option 126 (e.g., of the unlock options 120) in which the unlock screen displays outlines of two or more of 110(1), 110(2), 110(3), 110(4), 110(5), 110(6) indicating where the user is to provide the prints 106, 108. If the user selects the sequence hint option 126, then the outlines 110 may indicate an order in which the prints 106, 108 are to be provided. For example, if the sequence hint option 126 is enabled, and the user requests a sequence hint, then the outline 110(1) may display a "1" inside the outline 110(1) and the outline 110(2) may display a "2" inside the outline 110(2) and so on.

At 320, the process may store the prints, the sequence (if applicable), and whether or not hints are to be provided if requested. For example, in FIG. 2, after the UI 112 has verified the prints 106, 108 to be used to unlock the computing device 102, the UI 112 may save the prints 106, 108 as the saved prints 116. If the sequence options 124 is selected, the UI 112 may save the order 122(1) associated with the saved prints 118 that indicates the sequence in which the prints 106, 108 are to be provided to unlock the computing device 102. The UI 112 may save the hint option 126 that indicates whether a hint is to be provided if the user requests a hint.

Thus, a user may use a UI to select an option to create a multiple print unlock. The user may select a predefined template or a custom template. The user may select a sequence option that determines whether an order in which the prints are provided is taken into consideration as part of the unlock process. After selecting the options, the UI may prompt the user to enter two or more prints. If the sequence option is enabled, the UI may determine an order in which the two or more prints were initially entered. The UI may prompt the user to re-enter the prints to verify the prints being used to unlock. After the user subsequently enters the two or more prints, the UI may compare the subsequently provided prints with the initially provided prints. If the sequence option is enabled, the UI may compare the order in which the subsequently provided prints were entered and compare the order with the initially provided prints. If the subsequently provided prints match the initially provided prints and the order in which the subsequently provided prints were entered matches the order in which the initially provided prints were provided, then the UI may save the prints, the order, and the option selections. If the sequence option is disabled, the UI may prompt the user to re-enter the prints to verify the prints being used to unlock. After the user subsequently enters the two or more prints, the UI may compare the subsequently provided prints with the initially provided prints. If the subsequently provided prints match the initially provided prints, then the UI may save the prints and the option selections.

FIG. 4 is a flowchart of a process 400 to receive a multiple print unlock, according to some embodiments, according to some embodiments. For example, the process 400 may be performed by a software application executing on a computing device, such as the UI 112 of FIGS. 1 and 2.

At 402, the process may display a message indicating that the computing device is locked and to unlock, multiple prints are to be provided. For example, in FIG. 2, after the computing device 102 is locked (e.g., due to inactivity for more than a predetermined amount of time), the UI 112 may lock the computing device 102. If the UI 112 detects that the user is attempting to use the computing device 102, then the UI 112 may display a message indicating that the computing device 102 is currently locked and prompt the user to enter the prints 106, 108 to unlock the computing device 102.

At 404, the process may retrieve saved prints, an order (e.g., sequence) option, and hint preferences. At 406, according to the hint preference, the process may display print placement outlines (hints) on the touchscreen display device. At 408, the process may receive prints ("received prints") in a particular order. At 410 a determination may be made whether an order was specified using the order option. If the process determines, at 410, that "yes" an order was specified, then the process may proceed to 412. If the process determines, at 410, that "no" an order was not specified, then the process may proceed to 418. At 412, the process may determine if the particular order (in which the prints were received) matches a saved order associated with saved prints. If the process determines, at 412, that "yes" the particular order (in which the prints were received) matches the saved order associated with the saved prints, then the process may proceed to 418. If the process determines, at 412, that "no" the particular order (in which the prints were received) fails to match the saved order associated with the saved prints, then the process may proceed to 414. For example, in FIG. 2, the user may provide the prints 106, 108 in a particular order. The UI 112 may receive, using the touchscreen display device 104, the prints 106, 108, to create the received prints 118. If the sequence option 124 (of the unlock options 120) is enabled, the UI 112 may determine the order 122(2) of the received prints 118. If the order 122(2) matches the order 122(1), and the received prints 118 match the saved prints 116, then the UI 112 may unlock the computing device 102. If the sequence option 124 is not enabled, then the UI 112 may determine whether the received prints 118 match the saved prints 116 (e.g., ignoring the order 122(2) in which the received prints 118 were provided). The UI 112 may unlock the computing device 102 if the UI 112 determines that the received prints 118 match the saved prints 116. If the received prints 118 do not match the saved prints 116 or the order 122(2) does not match the order 122(1), then, in some cases, the user may request a hint, and the UI 112 may display the outlines 110.

At 414, the process may determine if a number of retries satisfies a predetermined number of retries. At 416, the process may lockout the user (e.g., further attempts to provide unlock prints are ignored) and, in some cases, a procedure to reset the unlock prints may be performed. If the process determines, at 414, that "no" the number of retries fails to satisfy the predetermined number of retries, then the process may proceed to 406. If the process determines, at 414, that "yes" the number of retries satisfies the predetermined number of retries, then the process may proceed to 416. For example, in FIG. 2, the UI 112 may provide the user with a predetermined number of retries to unlock the computing device 102. If the received prints 118 do not match the saved prints 116 or the order 122(2) does not match the order 122(1), then the UI 112 may lock out the user.

At 418, the process may determine whether the received prints match the saved prints. If the process determines, at 418, that the received prints match the saved prints, then the process may unlock the device (e.g., transition from locked state to unlocked state), at 420. If the process determines, at 418, that the received prints do not match the saved prints, then the process may proceed to 406. For example, in FIG. 2, if the sequence option 124 is disabled, then the computing device 102 may remain unlocked until the received prints 118 match the saved prints 116. If the sequence option 124 is enabled, the computing device 102 may remain unlocked until the received prints 118 match the saved prints 116 and the order 122(2) of the received prints 118 matches the order 122(1) of the saved prints 116. The UI 112 may enable the user to enter the prints 106, 108 a predetermined number of times (e.g., predetermined number of tries) before locking out the user permanently. If the user is permanently locked out, the user may contact a representative of the manufacturer of the computing device 102 to reset the unlock code. In some cases, if the user enabled the sequence option and the received prints 118 do not match the saved prints 116, then the computing device 102 may reset the unlock code by asking the user to enter two (or more) prints, such as both thumb prints or a thumb print and a finger print. Resetting the unlock code may result in the UI 112 asking the user to enter two or more prints, specify whether to use a sequence option and the like, as described herein.

Thus, after a predetermined period of inactivity, a computing device may lock itself. A user may be prompted to provide two or more prints to unlock the computing device. The user may provide two or more prints in a particular order. A user interface (UI) may compare the received prints with previously saved prints. If the user has not selected a sequence option and the prints match, then the UI may unlock the computing device. If the prints do not match, the UI may prompt the user to retry providing the prints. If the user has selected a sequence option and the prints match, then the UI may determine if the sequence in which the prints were provided matches an order associated with the previously saved prints. If the sequence in which the prints were provided does not match the order in which the previously saved prints were provided, then the UI may prompt the user to retry providing the prints. If the user fails to provide prints that match the saved prints and, if the sequence option is enabled, fails to provide the prints in the order in which the saved prints were provided, then the UI may provide the user with a predetermined number of retries, after which the UI may lockout the user and ask the user to contact a service representative or the like.

Figure 5:
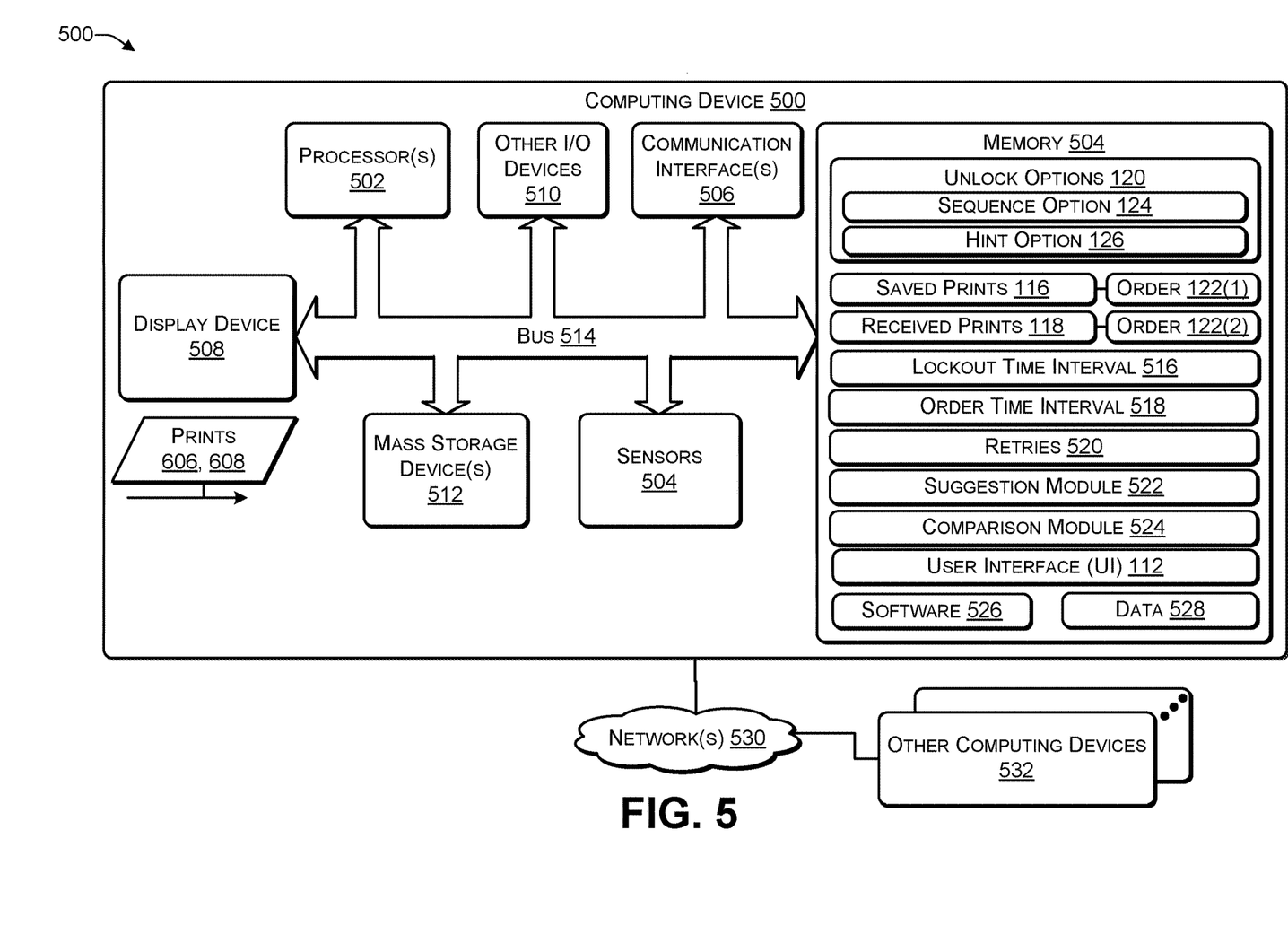
FIG. 5 illustrates an example configuration of a computing device that can be used to implement the systems and techniques described herein.

FIG. 5 illustrates an example configuration of a computing device 500 that can be used to implement the systems and techniques described herein, such as for example, the computing device 102 of FIG. 1 and FIG. 2.

The computing device 500 may include one or more processors 502 (e.g., CPU, GPU, or the like), a memory 504, communication interfaces 506, a display device 508 (e.g., the touchscreen display device 102 of FIGS. 1 and 2), other input/output (I/O) devices 510 (e.g., keyboard, trackball, and the like), and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The computing device 500 may include one or more communication interfaces 506 for exchanging data via a network 530 with other computing devices 532. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 (e.g., the touchscreen display device 102 of FIGS. 1 and 2) may be used for displaying content (e.g., information and images) to users and for receiving input, such as two or more of the prints 606, 608. Other I/O devices 510 may be devices that receive various inputs from a user and provide various outputs to the user, and may include a keyboard, a touchpad, a mouse, a printer, audio input/output devices, and so forth.

The computer storage media, such as memory 504 and mass storage devices 512, may be used to store software and data. For example, the computer storage media may be used to store the unlock options 120, the saved prints 116 and the associated order 122(1), the received prints 118 and the associated order 122(2), a lockout time interval 516, an order time interval 518, a number of retries 520, a suggestion module 522, a comparison module 524, the UI 112, software 526 (e.g., an operating system, drivers, one or more applications, and the like), and data 528. The computing device 500 may lock itself under particular conditions, such as if the computing device 102 is unused for more than a predetermined amount of time specified by the lockout time interval 516 (e.g., X minutes, where X=1, 2, 5, 10 or the like). The number of retries 520 may specify how many times (e.g., 2, 3, 4, 5 or the like) a user may attempt to unlock the computing device 500 before a lockout process is performed. The lockout process may prompt the user to call a representative of the manufacturer of the computing device 500 to reset the unlock process.

If the sequence option 124 of the unlock options 120 is enabled, the UI 112 may determine an order 122(2) associated with the received prints 118. For example, the UI 112 may determine, based on the received prints 118, that print 106 is provided at time T1, print 108 is provided at time T2, and determine a difference delta=T2−T1 (e.g., subtract T1 from T2). If delta satisfies the order time interval 518 (e.g., T2−T1 is between 300 and 600 milliseconds) and the received prints 118 match the saved prints 116, then the UI 112 may unlock the computing device 102. If the sequence option 124 of the unlock options 120 is disabled, the UI 112 may determine whether the received prints 118 are provided substantially at the same time (e.g., simultaneously). For example, the UI 112 may determine, based on the received prints 118, that print 106 is provided at time T1, print 108 is provided at time T2, and determine a difference delta=T2−T1 (e.g., subtract T1 from T2). If delta is less than the order time interval (e.g., T2−T1 is less than 300 milliseconds, indicating that the prints 1608, 108 are received substantially at the same time), and the received prints 118 match the saved prints 116, then the UI 112 may unlock the computing device 102.

The suggestion module 522 may use the machine learning algorithm 128 of FIGS. 1 and 2 to suggest at least two patterns for entering the prints 106, 108 when performing an unlock. For example, when the user is using the computing device 102, the machine learning algorithm 128 may monitor the user's hand position (e.g., position means a location on the touchscreen display device 104), finger positions, and fingertip positions on the touchscreen display device 104. The machine learning algorithm 128 may use the data gathered by monitoring the user's hand, finger, and fingertip positions as training data to identify and suggest a set of (print) positions 132 (for the prints 106, 108). The set of positions 132 may include a pattern of the prints 106, 108 on the touchscreen display device 104 that the user most frequently performs. The advantage of the positions 132(1) suggested by the machine learning 128 is that the user can quickly place the user's prints in the positions 132(1) to perform an unlock. The user can of course use the suggested set of positions 132 or input the prints 106, 108 in a particular pattern and have the UI 112 save the positions as part of the saved prints 116.

The comparison module 524 may compare the received prints 118 with the saved prints 116 to determine if the received prints 118 match (e.g., 90%, 95%, 98% similar) the saved prints 116. The comparison module 524 may compare the order 122(2) of the received prints 118 with the order 122(1) of the saved prints 116 to determine if the received prints 118 were provided in the same order as the saved prints 116.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    displaying, by one or more processors of a computing device, a user interface to configure a multiple print unlock for the computing device;
    determining, by the one or more processors, a first plurality of prints placed on a touchscreen display device connected to the computing device, wherein the first plurality of prints comprise one of:
        a first thumb print and a second thumb print;
        the first thumb print, the second thumb print, and one or more fingerprints; or
        two or more of the fingerprints;
    determining, by the one or more processors, that the computing device has been inactive for at least a predetermined amount of time;
    locking, by the one or more processors, the computing device to prevent the computing device from being used;
    determining, by the one or more processors, a second plurality of prints placed on the touchscreen display device, wherein the placement of the second plurality of prints corresponds to re-entered verification prints placed contemporaneously to the first plurality of prints;
    performing, by the one or more processors, a comparison between the second plurality of prints and the first plurality of prints;
    determining, by the one or more processors and using the comparison, that the second plurality of prints matches the first plurality of prints; and
    unlocking, by the one or more processors, the computing device.

2. The method of claim 1, the method further comprising:
    locking the computing device based on determining that the computing device has been inactive for at least the predetermined amount of time;
    determining that a sequence option is selected;
    determining a third plurality of prints placed on the touchscreen display device;
    performing a first comparison of the first plurality of prints to the third plurality of prints;
    determining a received order in which the third plurality of prints are placed on the touchscreen display device;
    performing a second comparison of an order associated with the first plurality of prints to the received order;
    determining, based on the first comparison and the second comparison, that:
        the third plurality of prints matches the first plurality of prints; and
        the received order matches the order associated with the first plurality of prints; and
    unlocking the computing device.

3. The method of claim 1, the method further comprising:
    determining that a hint option is selected; and
    displaying, on the touchscreen display device, an outline associated with each print in the first plurality of prints.

4. The method of claim 3, the method further comprising:
    determining that an order hint option is selected; and
    displaying, on the touchscreen display device, a number within the outline associated with each print indicating a numerical order in which to provide the second plurality of prints.

5. The method of claim 1, the method further comprising:
    determining that the computing device has been inactive for at least the predetermined amount of time;
    locking the computing device;
    determining a fourth plurality of prints placed on the touchscreen display device;
    determining that the fourth plurality of prints do not match the first plurality of prints; and
    prompting a user to retry.

6. The method of claim 5, the method further comprising:
    determining that the user has performed a maximum number of retries; and
    performing a lockout process including ignoring additional retries until a predetermined amount of time has elapsed.

7. The method of claim 1, wherein:
    when a sequence option is selected, a time difference between a particular print of the first plurality of prints being placed on the touchscreen display device and a subsequent print of the first plurality of prints being placed on the touchscreen display device is within a predetermined time interval; and
    when the sequence option is deselected, the time difference is below the predetermined time interval.

8. A computing device comprising:
    one or more processors; and
    one or more non-transitory computer-readable media storing instructions executable by the one or more processors to perform operations comprising:
        displaying a user interface to configure a multiple print unlock for the computing device;
        determining a first plurality of prints placed on a touchscreen display device connected to the computing device, wherein the first plurality of prints comprise one of:
            a first thumb print and a second thumb print;
            the first thumb print, the second thumb print, and one or more fingerprints; or
            two or more of the fingerprints;
        determining that the computing device has been inactive for at least a predetermined amount of time;

locking the computing device to prevent the computing device from being used;
determining a second plurality of prints placed on the touchscreen display device,
wherein the placement of the second plurality of prints corresponds to re-entered verification prints placed contemporaneously to the first plurality of prints;
performing a comparison between the second plurality of prints and the first plurality of prints;
determining, using the comparison, that the second plurality of prints matches the first plurality of prints; and
unlocking the computing device.

9. The computing device of claim 8, the operations further comprising:
locking the computing device based on determining that the computing device has been inactive for at least the predetermined amount of time;
determining that a sequence option is selected;
determining a third plurality of prints placed on the touchscreen display device;
performing a first comparison of the first plurality of prints to the third plurality of prints;
determining a received order in which the third plurality of prints are placed on the touchscreen display device;
performing a second comparison of an order associated with the first plurality of prints to the received order;
determining, based on the first comparison and the second comparison, that:
the third plurality of prints matches the first plurality of prints; and
the received order matches the order associated with the first plurality of prints; and
unlocking the computing device.

10. The computing device of claim 8, the operations further comprising:
determining that a hint option is selected; and
displaying, on the touchscreen display device, an outline associated with each print in the first plurality of prints.

11. The computing device of claim 10, the operations further comprising:
determining that an order hint option is selected; and
displaying, on the touchscreen display device, a number within the outline associated with each print indicating a numerical order in which to provide the second plurality of prints.

12. The computing device of claim 8, the operations further comprising:
determining that the computing device has been inactive for at least the predetermined amount of time;
locking the computing device;
determining a fourth plurality of prints placed on the touchscreen display device;
determining that the fourth plurality of prints do not match the first plurality of prints; and
prompting a user to retry.

13. The computing device of claim 8, wherein:
when a sequence option is selected, a time difference between a particular print of first the plurality of prints being placed on the touchscreen display device and a subsequent print of the first plurality of prints being placed on the touchscreen display device is within a predetermined time interval; and
when the sequence option is deselected, the time difference is below the predetermined time interval.

14. One or more non-transitory computer readable media storing instructions executable by one or more processors to perform operations comprising:
displaying a user interface to configure a multiple print unlock for a computing device;
determining a first plurality of prints placed on a touchscreen display device connected to the computing device, wherein the first plurality of prints comprise one of:
a first thumb print and a second thumb print;
the first thumb print, the second thumb print, and one or more fingerprints; or
two or more of the fingerprints;
determining that the computing device has been inactive for at least a predetermined amount of time;
locking the computing device to prevent the computing device from being used;
determining a second plurality of prints placed on the touchscreen display device, wherein the placement of the second plurality of prints corresponds to re-entered verification prints placed contemporaneously to the first plurality of prints;
performing a comparison between the second plurality of prints and the first plurality of prints;
determining, using the comparison, that the second plurality of prints matches the first plurality of prints; and
unlocking the computing device.

15. The one or more non-transitory computer readable media of claim 14, the operations further comprising:
locking the computing device based on determining that the computing device has been inactive for at least the predetermined amount of time;
determining that a sequence option is selected;
determining a third plurality of prints placed on the touchscreen display device;
performing a first comparison of the first plurality of prints to the third plurality of prints;
determining a received order in which the third plurality of prints are placed on the touchscreen display device;
performing a second comparison of an order associated with the first plurality of prints to the received order;
determining, based on the first comparison and the second comparison, that:
the third plurality of prints matches the first plurality of prints; and
the received order matches the order associated with the first plurality of prints; and
unlocking the computing device.

16. The one or more non-transitory computer readable media of claim 14, the operations further comprising:
determining that a hint option is selected; and
displaying, on the touchscreen display device, an outline associated with each print in the first plurality of prints.

17. The one or more non-transitory computer readable media of claim 16, the operations further comprising:
determining that an order hint option is selected; and
displaying, on the touchscreen display device, a number within the outline associated with each print indicating a numerical order in which to provide the second plurality of prints.

18. The one or more non-transitory computer readable media of claim 17, the operations further comprising:
determining that the computing device has been inactive for at least the predetermined amount of time;
locking the computing device;
determining a fourth plurality of prints placed on the touchscreen display device;
determining that the fourth plurality of prints do not match the first plurality of prints; and
prompting a user to retry.

19. The one or more non-transitory computer readable media of claim 14, the operations further comprising:
- determining that a user has performed a maximum number of retries; and
- performing a lockout process including ignoring additional retries until a predetermined amount of time has elapsed.

20. The one or more non-transitory computer readable media of claim 14, wherein:
- when a sequence option is selected, a time difference between a particular print of the first plurality of prints being placed on the touchscreen display device and a subsequent print of the first plurality of prints being placed on the touchscreen display device is within a predetermined time interval; and
- when the sequence option is deselected, the time difference is below the predetermined time interval.

\* \* \* \* \*